(12) United States Patent
Miller et al.

(10) Patent No.: US 6,181,822 B1
(45) Date of Patent: *Jan. 30, 2001

(54) DATA COMPRESSION APPARATUS AND METHOD

(75) Inventors: Daniel B. Miller; David B. Silver, both of New York, NY (US)

(73) Assignee: The Duck Corporation, New York, NY (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/954,819

(22) Filed: Oct. 21, 1997

Related U.S. Application Data

(63) Continuation of application No. 08/402,952, filed on Mar. 10, 1995, now abandoned, which is a continuation-in-part of application No. 08/060,613, filed on May 12, 1993.

(51) Int. Cl.[7] ........................................................ G06K 9/36
(52) U.S. Cl. ............................................................. 382/232
(58) Field of Search ..................................... 348/384, 393, 348/396, 397, 400, 401, 409, 410, 411, 412, 415, 420, 430, 431; 358/426, 261.1–261.3, 427, 430, 432, 433; 382/232, 236, 238, 239, 244, 245, 246, 247, 252

(56) References Cited

U.S. PATENT DOCUMENTS

| 3,825,832 | * | 7/1974 | Frei et al. | 348/411 |
| 4,719,642 | * | 1/1988 | Lucas | 348/409 |
| 4,729,127 | * | 3/1988 | Chan et al. | 382/240 |
| 4,736,446 | * | 4/1988 | Reynolds et al. | 382/276 |
| 4,868,764 | * | 9/1989 | Richards | 382/232 |
| 5,136,371 | * | 8/1992 | Savatier et al. | 348/409 |
| 5,270,812 | * | 12/1993 | Richards | 348/415 |
| 5,432,870 | * | 7/1995 | Schwartz | 382/232 |

* cited by examiner

Primary Examiner—Jose L. Couso
(74) Attorney, Agent, or Firm—Levisohn, Lerner, Berger & Langsam

(57) ABSTRACT

A method and apparatus is disclosed for digitally compressing video signals. The method and apparatus provides a system which generates values related to the differences between respective pixel locations and an x,y pixel display. The differences generated between proximate pixel locations are used to generate various delta values which are encoded in an asymmetric fashion. The asymmetric coding eliminates artifacts in the displayed image, and the delta encoding is performed in both a horizontal and vertical direction (otherwise known as Two-Dimensional Delta Encoding) and this operation tends to randomly distribute error in the compression process across the visual image so as to approximate noise or grain generally perceived by the viewer in an analog display.

18 Claims, 22 Drawing Sheets

| | |
|---|---|
| I | INPUT PIXEL (CORRECTED) |
| T | TOP PIXEL (DECODED) |
| O | OUTPUT PIXEL (DECODED) |
| Vp | PREVIOUS VERTICAL DIFFERENCE |
| Vi | NEW VERTICAL DIFFERENCE(INPUT) |
| Vio | VERTICAL DIFFERENCE |
| DELTA Vio | DIFFERENCE BETWEEEN Vp AND Vi |
| DELTA Vq | QUANTIZED DIFFERENCE |
| S | CODED SYMBOL |
| E | LOSSLESS-ENCODED BITSTREAM |

*FIG. 2A*

| | | | | | | | | |
|---|---|---|---|---|---|---|---|---|
| 0) | (LARGE DELTA PAIR FOLLOWS) | | | | | | | |
| 1) | 0 | 0 | 0 | 0 | 0 | 0 | 0 | 0 |
| 2) | 1 | 0 | 0 | 0 | 0 | 0 | 0 | 0 |
| 3) | 0 | 1 | 0 | 0 | 0 | 0 | 0 | 0 |
| 4) | 0 | 0 | 1 | 0 | 0 | 0 | 0 | 0 |
| 5) | 0 | 0 | 0 | 1 | 0 | 0 | 0 | 0 |
| 6) | 0 | 0 | 0 | 0 | 1 | 0 | 0 | 0 |
| 7) | 0 | 0 | 0 | 0 | 0 | 1 | 0 | 0 |
| 8) | 0 | 0 | 0 | 0 | 0 | 0 | 1 | 0 |
| 9) | 0 | 0 | 0 | 0 | 0 | 0 | 0 | 1 |
| 10) | 0 | 0 | 0 | 0 | 0 | 0 | | |
| 11) | 1 | 0 | 0 | 0 | 0 | 0 | | |
| 12) | 0 | 1 | 0 | 0 | 0 | 0 | | |
| 13) | 0 | 0 | 1 | 0 | 0 | 0 | | |
| 14) | 0 | 0 | 0 | 1 | 0 | 0 | | |
| 15) | 0 | 0 | 0 | 0 | 0 | 1 | | |
| 16) | 0 | 0 | 0 | 0 | 1 | 0 | | |
| 17) | 0 | 0 | 0 | 0 | 0 | 2 | | |
| 18) | 0 | 0 | 0 | 0 | 2 | 0 | | |
| 19) | 2 | 0 | 1 | 0 | 0 | 0 | | |
| 20) | 0 | 0 | 0 | 2 | 0 | 1 | | |
| 21) | 0 | 0 | 2 | 0 | 1 | 0 | | |
| 22) | 0 | 2 | 0 | 1 | 0 | 0 | | |
| 23) | 1 | 1 | 0 | 0 | 0 | 0 | | |
| 24) | 0 | 0 | 2 | 0 | 0 | 0 | | |
| 25) | 0 | 0 | 0 | 2 | 0 | 0 | | |
| 26) | 2 | 0 | 0 | 0 | 0 | 0 | | |
| 27) | 0 | 1 | 1 | 0 | 0 | 0 | | |
| 28) | 0 | 2 | 0 | 0 | 0 | 0 | | |
| 29) | 0 | 1 | 0 | 0 | 0 | 2 | | |
| 30) | 1 | 0 | 0 | 0 | 2 | 0 | | |
| 31) | 0 | 0 | 0 | 1 | 0 | 2 | | |
| 32) | 1 | 0 | 0 | 1 | 0 | 0 | | |
| 33) | 0 | 0 | 1 | 0 | 2 | 0 | | |
| 34) | 1 | 0 | 1 | 0 | 0 | 0 | | |
| 35) | 1 | 0 | 0 | 0 | 0 | 1 | | |
| 36) | 2 | 0 | 0 | 0 | 1 | 0 | | |
| 37) | 0 | 2 | 0 | 0 | 0 | 1 | | |
| 38) | 0 | 1 | 0 | 1 | 0 | 0 | | |
| 39) | 0 | 1 | 0 | 0 | 1 | 0 | | |
| 40) | 0 | 0 | 1 | 1 | 0 | 0 | | |
| 41) | 1 | 0 | 0 | 0 | 0 | 2 | | |

| | | | | | | |
|---|---|---|---|---|---|---|
| 42) | 0 | 0 | 0 | 1 | 1 | 0 |
| 43) | 0 | 0 | 0 | 0 | 1 | 1 |
| 44) | 1 | 0 | 0 | 0 | 1 | 0 |
| 45) | 0 | 1 | 0 | 0 | 0 | 1 |
| 46) | 0 | 0 | 0 | 0 | 2 | 2 |
| 47) | 0 | 2 | 0 | 1 | 0 | 1 |
| 48) | 1 | 0 | 2 | 0 | 1 | 0 |
| 49) | 0 | 1 | 0 | 2 | 0 | 1 |
| 50) | 2 | 0 | 1 | 0 | 1 | 0 |
| 51) | 0 | 1 | 0 | 0 | 2 | 0 |
| 52) | 0 | 0 | 1 | 0 | 0 | 1 |
| 53) | 2 | 1 | 1 | 0 | 0 | 0 |
| 54) | 1 | 0 | 0 | 2 | 0 | 1 |
| 55) | 1 | 2 | 0 | 1 | 0 | 0 |
| 56) | 0 | 1 | 2 | 0 | 1 | 0 |
| 57) | 0 | 1 | 0 | 2 | 0 | 0 |
| 58) | 1 | 0 | 2 | 0 | 0 | 0 |
| 59) | 0 | 0 | 1 | 0 | 0 | 2 |
| 60) | 0 | 0 | 0 | 1 | 2 | 0 |
| 61) | 0 | 0 | 0 | 2 | 2 | 1 |
| 62) | 0 | 0 | 0 | 2 | 2 | 0 |
| 63) | 0 | 0 | 0 | 0 | 1 | 2 |
| 64) | 0 | 0 | 0 | 0 | 2 | 1 |
| 65) | 2 | 0 | 1 | 1 | 0 | 0 |
| 66) | 0 | 0 | 0 | 1 | 0 | 1 |
| 67) | 1 | 1 | 1 | 0 | 0 | 0 |
| 68) | 0 | 0 | 2 | 0 | 1 | 2 |
| 69) | 0 | 0 | 2 | 0 | 1 | 1 |
| 70) | 2 | 0 | 1 | 0 | 0 | 2 |
| 71) | 0 | 2 | 0 | 1 | 2 | 0 |
| 72) | 0 | 0 | 2 | 2 | 1 | 1 |
| 73) | 0 | 0 | 1 | 0 | 1 | 0 |
| 74) | 0 | 2 | 1 | 1 | 0 | 0 |
| 75) | 0 | 0 | 2 | 1 | 1 | 0 |
| 76) | 0 | 0 | 0 | 2 | 0 | 3 |
| 77) | 2 | 0 | 1 | 0 | 0 | 1 |
| 78) | 0 | 0 | 1 | 2 | 0 | 1 |
| 79) | 1 | 1 | 0 | 0 | | |
| 80) | 0 | 0 | 2 | 2 | | |
| 81) | 2 | 0 | 0 | 0 | | |
| 82) | 0 | 1 | 1 | 0 | | |
| 83) | 0 | 2 | 2 | 0 | | |
| 84) | 0 | 0 | 2 | 0 | | |
| 85) | 0 | 2 | 0 | 0 | | |
| 86) | 1 | 0 | 0 | 1 | | |

FIG 2B (CONTINUED)

| | | | | |
|---|---|---|---|---|
| 87) | 0 | 0 | 1 | 1 |
| 88) | 0 | 2 | 0 | 1 |
| 89) | 0 | 2 | 2 | 1 |
| 90) | 0 | 0 | 0 | 2 |
| 91) | 2 | 0 | 0 | 2 |
| 92) | 0 | 1 | 0 | 1 |
| 93) | 1 | 0 | 1 | 0 |
| 94) | 1 | 0 | 0 | 2 |
| 95) | 2 | 2 | 0 | 0 |
| 96) | 1 | 0 | 0 | 0 |
| 97) | 0 | 1 | 0 | 0 |
| 98) | 2 | 1 | 0 | 0 |
| 99) | 1 | 2 | 0 | 0 |
| 100) | 0 | 0 | 1 | 0 |
| 101) | 2 | 0 | 1 | 2 |
| 102) | 0 | 1 | 1 | 1 |
| 103) | 0 | 0 | 0 | 1 |
| 104) | 0 | 1 | 0 | 2 |
| 105) | 1 | 1 | 0 | 2 |
| 106) | 1 | 1 | 0 | 1 |
| 107) | 1 | 0 | 2 | 0 |
| 108) | 2 | 0 | 0 | 1 |
| 109) | 2 | 2 | 1 | 1 |
| 110) | 0 | 0 | 1 | 2 |
| 111) | 2 | 0 | 1 | 0 |
| 112) | 2 | 2 | 0 | 1 |
| 113) | 0 | 1 | 2 | 0 |
| 114) | 0 | 0 | 2 | 1 |
| 115) | 1 | 0 | 1 | 1 |
| 116) | 2 | 1 | 1 | 0 |
| 117) | 1 | 0 | 2 | 2 |
| 118) | 0 | 2 | 0 | 3 |
| 119) | 1 | 2 | 0 | 1 |
| 120) | 2 | 0 | 1 | 1 |
| 121) | 1 | 1 | 1 | 0 |
| 122) | 2 | 0 | 3 | 0 |
| 123) | 1 | 1 | 2 | 0 |
| 124) | 0 | 2 | 1 | 0 |
| 125) | 2 | 2 | 1 | 0 |
| 126) | 1 | 1 | 1 | 1 |
| 127) | 3 | 0 | 2 | 0 |
| 128) | 3 | 0 | 0 | 0 |
| 129) | 0 | 1 | 2 | 2 |
| 130) | 0 | 1 | 1 | 2 |
| 131) | 0 | 2 | 1 | 1 |

FIG 2B (CONTINUED)

| | | | | |
|---|---|---|---|---|
| 132) | 0 | 3 | 0 | 2 |
| 133) | 0 | 3 | 0 | 0 |
| 134) | 1 | 0 | 2 | 1 |
| 135) | 1 | 2 | 2 | 0 |
| 136) | 0 | 0 | 0 | 0 |
| 137) | 1 | 2 | 2 | 1 |
| 138) | 2 | 1 | 1 | 1 |
| 139) | 0 | 2 | 2 | 2 |
| 140) | 1 | 0 | 1 | 2 |
| 141) | 3 | 1 | 0 | 0 |
| 142) | 2 | 0 | 2 | 0 |
| 143) | 0 | 0 | 0 | 3 |
| 144) | 0 | 2 | 0 | 2 |
| 145) | 2 | 2 | 2 | 0 |
| 146) | 0 | 1 | 2 | 1 |
| 147) | 2 | 1 | 0 | 2 |
| 148) | 2 | 1 | 1 | 2 |
| 149) | 1 | 1 | 2 | 2 |
| 150) | 0 | 0 | 3 | 0 |
| 151) | 1 | 2 | 1 | 1 |
| 152) | 2 | 0 | 2 | 2 |
| 153) | 3 | 1 | 2 | 0 |
| 154) | 2 | 1 | 3 | 0 |
| 155) | 2 | 2 | 0 | 2 |
| 156) | 2 | 2 | 2 | 2 |
| 157) | 2 | 0 | 3 | 1 |
| 158) | 1 | 3 | 0 | 2 |
| 159) | 0 | 3 | 1 | 0 |
| 160) | 1 | 1 | 1 | 2 |
| 161) | 0 | 0 | 1 | 3 |
| 162) | 2 | 1 | 0 | 1 |
| 163) | 1 | 2 | 0 | 3 |
| 164) | 1 | 3 | 0 | 0 |
| 165) | 1 | 3 | 1 | 0 |
| 166) | 0 | 2 | 1 | 3 |
| 167) | 3 | 0 | 0 | 1 |
| 168) | 1 | 2 | 1 | 0 |
| 169) | 2 | 2 | 1 | 3 |
| 170) | 0 | 3 | 1 | 2 |
| 171) | 3 | 1 | 0 | 1 |
| 172) | 3 | 0 | 2 | 2 |
| 173) | 0 | 0 | 3 | 1 |
| 174) | 0 | 1 | 3 | 1 |
| 175) | 0 | 2 | 2 | 3 |
| 176) | 0 | 1 | 3 | 0 |

FIG 2B (CONTINUED)

| | | | | |
|---|---|---|---|---|
| 177) | 1 | 1 | 2 | 1 |
| 178) | 2 | 2 | 2 | 1 |
| 179) | 0 | 1 | 1 | 3 |
| 180) | 1 | 0 | 0 | 3 |
| 181) | 2 | 2 | 0 | 3 |
| 182) | 3 | 0 | 2 | 1 |
| 183) | 2 | 1 | 3 | 1 |
| 184) | 3 | 3 | 0 | 0 |
| 185) | 1 | 3 | 1 | 2 |
| 186) | 1 | 1 | 3 | 1 |
| 187) | 3 | 0 | 0 | 2 |
| 188) | 1 | 2 | 0 | 2 |
| 189) | 1 | 1 | 1 | 3 |
| 190) | 1 | 2 | 2 | 2 |
| 191) | 2 | 0 | 3 | 2 |
| 192) | 1 | 0 | 1 | 3 |
| 193) | 2 | 2 | 3 | 1 |
| 194) | 2 | 1 | 2 | 0 |
| 195) | 0 | 1 | 3 | 3 |
| 196) | 3 | 3 | 1 | 0 |
| 197) | 2 | 0 | 1 | 3 |
| 198) | 3 | 1 | 2 | 2 |
| 199) | 1 | 3 | 3 | 0 |
| 200) | 0 | 1 | 0 | 3 |
| 201) | 1 | 1 | 3 | 3 |
| 202) | 2 | 0 | 2 | 1 |
| 203) | 1 | 3 | 3 | 1 |
| 204) | 0 | 3 | 2 | 2 |
| 205) | 3 | 1 | 0 | 2 |
| 206) | 0 | 0 | 2 | 4 |
| 207) | 0 | 0 | | |
| 208) | 1 | 0 | | |
| 209) | 2 | 0 | | |
| 210) | 3 | 0 | | |
| 211) | 4 | 0 | | |
| 212) | 5 | 0 | | |
| 213) | 6 | 0 | | |
| 214) | 0 | 1 | | |
| 215) | 1 | 1 | | |
| 216) | 2 | 1 | | |
| 217) | 3 | 1 | | |
| 218) | 4 | 1 | | |
| 219) | 5 | 1 | | |
| 220) | 6 | 1 | | |
| 221) | 0 | 2 | | |

FIG 2B (CONTINUED)

| | | |
|---|---|---|
| 222) | 1 | 2 |
| 223) | 2 | 2 |
| 224) | 3 | 2 |
| 225) | 4 | 2 |
| 226) | 5 | 2 |
| 227) | 6 | 2 |
| 228) | 0 | 3 |
| 229) | 1 | 3 |
| 230) | 2 | 3 |
| 231) | 3 | 3 |
| 232) | 4 | 3 |
| 233) | 5 | 3 |
| 234) | 6 | 3 |
| 235) | 0 | 4 |
| 236) | 1 | 4 |
| 237) | 2 | 4 |
| 238) | 3 | 4 |
| 239) | 4 | 4 |
| 240) | 5 | 4 |
| 241) | 6 | 4 |
| 242) | 0 | 5 |
| 243) | 1 | 5 |
| 244) | 2 | 5 |
| 245) | 3 | 5 |
| 246) | 4 | 5 |
| 247) | 5 | 5 |
| 248) | 6 | 5 |
| 249) | 0 | 6 |
| 250) | 1 | 6 |
| 251) | 2 | 6 |
| 252) | 3 | 6 |
| 253) | 4 | 6 |
| 254) | 5 | 6 |
| 255) | 6 | 6 |

END OF FIG 2B

| | |
|---|---|
| I | INPUT PIXEL (CORRECTED) |
| T | TOP PIXEL (DECODED) |
| O | OUTPUT PIXEL (DECODED) |
| Vp | PREVIOUS VERTICAL DIFFERENCE |
| Vi | NEW VERTICAL DIFFERENCE (INPUT) |
| Vio | VERTICAL DIFFERENCE |
| DELTA Vio | DIFFERENCE BETWEEEN Vp AND Vi |
| DELTA Vq | QUANTIZED DIFFERENCE |
| S | CODED SYMBOL |
| E | LOSSLESS-ENCODED BITSTREAM |

*FIG. 3A*

| | | | | |
|---|---|---|---|---|
| 0) | ( large delta pair follows ) | 34) | ffff f7be ffff f7be 00000001 |
| 1) | 00000000 00000000 00000000 00000001 | 35) | ffff f7be 00000000 f7be0001 |
| 2) | ffff f7be 00000000 00000000 00000001 | 36) | 00000842 00000000 ffff f7bf |
| 3) | f7be0000 00000000 00000000 00000001 | 37) | 08420000 00000000 f7be0001 |
| 4) | 00000000 ffff f7be 00000000 00000001 | 38) | f7be0000 f7be0000 00000001 |
| 5) | 00000000 f7be0000 00000000 00000001 | 39) | f7be0000 00000000 ffff f7bf |
| 6) | 00000000 00000000 ffff f7be 00000001 | 40) | 00000000 f7bdf7be 00000001 |
| 7) | 00000000 00000000 f7be0000 00000001 | 41) | ffff f7be 00000000 08420001 |
| 8) | 00000000 00000000 00000000 ffff f7bf | 42) | 00000000 f7be0000 ffff f7bf |
| 9) | 00000000 00000000 00000000 f7be0001 | 43) | 00000000 00000000 f7bdf7bf |
| 10) | 00000000 00000000 00000001 | 44) | ffff f7be 00000000 ffff f7bf |
| 11) | ffff f7be 00000000 00000001 | 45) | f7be0000 00000000 f7be0001 |
| 12) | f7be0000 00000000 00000001 | 46) | 00000000 00000000 08420843 |
| 13) | 00000000 ffff f7be 00000001 | 47) | 08420000 f7be0000 f7be0001 |
| 14) | 00000000 f7be0000 00000001 | 48) | ffff f7be 00000842 ffff f7bf |
| 15) | 00000000 00000000 f7be0001 | 49) | f7be0000 08420000 f7be0001 |
| 16) | 00000000 00000000 ffff f7bf | 50) | 00000842 ffff f7be ffff f7bf |
| 17) | 00000000 00000000 08420001 | 51) | f7be0000 00000000 00000843 |
| 18) | 00000000 00000000 00000843 | 52) | 00000000 ffff f7be f7be0001 |
| 19) | 00000842 ffff f7be 00000001 | 53) | f7be0842 ffff f7be 00000001 |
| 20) | 00000000 08420000 f7be0001 | 54) | ffff f7be 08420000 f7be0001 |
| 21) | 00000000 00000842 ffff f7bf | 55) | 0841f7be f7be0000 00000001 |
| 22) | 08420000 f7be0000 00000001 | 56) | f7be0000 00000842 ffff f7bf |
| 23) | f7bdf7be 00000000 00000001 | 57) | f7be0000 08420000 00000001 |
| 24) | 00000000 00000842 00000001 | 58) | ffff f7be 00000842 00000001 |
| 25) | 00000000 08420000 00000001 | 59) | 00000000 ffff f7be 08420001 |
| 26) | 00000842 00000000 00000001 | 60) | 00000000 f7be0000 00000843 |
| 27) | f7be0000 ffff f7be 00000001 | 61) | 00000000 08420000 f7be0843 |
| 28) | 08420000 00000000 00000001 | 62) | 00000000 08420000 00000843 |
| 29) | f7be0000 00000000 08420001 | 63) | 00000000 00000000 0841f7bf |
| 30) | ffff f7be 00000000 00000843 | 64) | 00000000 00000000 f7be0843 |
| 31) | 00000000 f7be0000 08420001 | | |
| 32) | ffff f7be f7be0000 00000001 | | |
| 33) | 00000000 ffff f7be 00000843 | | |

| | | | |
|---|---|---|---|
| 65) | 00000842 f 7bdf 7be 00000001 | 102) | f 7be0000 f 7bdf 7bf |
| 66) | 00000000 f 7be0000 f 7be0001 | 103) | 00000000 f 7be0001 |
| 67) | f 7bdf 7be f f f f f7be 00000001 | 104) | f 7be0000 08420001 |
| 68) | 00000000 00000842 0841f 7bf | 105) | f 7bdf 7be 08420001 |
| 69) | 00000000 00000842 f 7bdf 7bf | 106) | f 7bdf 7be f 7be0001 |
| 70) | 00000842 f f f f f7be 08420001 | 107) | f f f f f7be 00000843 |
| 71) | 08420000 f 7be0000 00000843 | 108) | 00000842 f 7be0001 |
| 72) | 00000000 08420842 f 7bdf 7bf | 109) | 08420842 f 7bdf 7bf |
| 73) | 00000000 f f f f f7be f f f f f7bf | 110) | 00000000 0841f 7bf |
| 74) | 08420000 f 7bdf 7be 00000001 | 111) | 00000842 f f f f f7bf |
| 75) | 00000000 f 7be0842 f f f f f7bf | 112) | 08420842 f 7be0001 |
| 76) | 00000000 08420000 e73a0001 | 113) | f 7be0000 00000843 |
| 77) | 00000842 f f f f f7be f 7be0001 | 114) | 00000000 f 7be0843 |
| 78) | 00000000 0841f 7be f 7be0001 | 115) | f f f f f7be f 7bdf 7bf |
| 79) | f 7bdf 7be 00000001 | 116) | f 7be0842 f f f f f7bf |
| 80) | 00000000 08420843 | 117) | f f f f f7be 08420843 |
| 81) | 00000842 00000001 | 118) | 08420000 e73a0001 |
| 82) | f 7be0000 f f f f f7bf | 119) | 0841f 7be f 7be0001 |
| 83) | 08420000 00000843 | 120) | 00000842 f 7bdf 7bf |
| 84) | 00000000 00000843 | 121) | f 7bdf 7be f f f f f7bf |
| 85) | 08420000 00000001 | 122) | 00000842 f f f f e73b |
| 86) | f f f f f7be f 7be0001 | 123) | f 7bdf 7be 00000843 |
| 87) | 00000000 f 7bdf 7bf | 124) | 08420000 f f f f f7bf |
| 88) | 08420000 f 7be0001 | 125) | 08420842 f f f f f7bf |
| 89) | 08420000 f 7be0843 | 126) | f 7bdf 7be f 7bdf 7bf |
| 90) | 00000000 08420001 | 127) | f f f f e73a 00000843 |
| 91) | 00000842 08420001 | 128) | f f f f e73a 00000001 |
| 92) | f 7be0000 f 7be0001 | 129) | f 7be0000 08420843 |
| 93) | f f f f f7be f f f f f7bf | 130) | f 7be0000 0841f 7bf |
| 94) | f f f f f7be 08420001 | 131) | 08420000 f 7bdf 7bf |
| 95) | 08420842 00000001 | 132) | e73a0000 08420001 |
| 96) | f f f f f7be 00000001 | 133) | e73a0000 00000001 |
| 97) | f 7be0000 00000001 | 134) | f f f f f7be f 7be0843 |
| 98) | f 7be0842 00000001 | 135) | 0841f 7be 00000843 |
| 99) | 0841f 7be 00000001 | 136) | 00000000 00000001 |
| 100) | 00000000 f f f f f7bf | | |
| 101) | 00000842 0841f 7bf | | |

FIG 3B (CONTINUED)

137) 0841f 7be  f 7be0843
138) f 7be0842  f 7bdf 7bf
139) 08420000  08420843
140) f f f f f7be  0841f 7bf
141) f 7bde73a  00000001
142) 00000842  00000843
143) 00000000  e73a0001
144) 08420000  08420001
145) 08420842  00000843
146) f 7be0000  f 7be0843
147) f 7be0842  08420001
148) f 7be0842  0841f 7bf
149) f 7bdf 7be  08420843
150) 00000000  f f f f e73b
151) 0841f 7be  f 7bdf 7bf
152) 00000842  08420843
153) f 7bde73a  00000843
154) f 7be0842  f f f f e73b
155) 08420842  08420001
156) 08420842  08420843
157) 00000842  f 7bde73b
158) e739f 7be  08420001
159) e73a0000  f f f f f7bf
160) f 7bdf 7be  0841f 7bf
161) 00000000  e739f 7bf
162) f 7be0842  f 7be0001
163) 0841f 7be  e73a0001
164) e739f 7be  00000001
165) e739f 7be  f f f f f7bf
166) 08420000  e739f 7bf
167) f f f fe73a  f 7be0001
168) 0841f 7be  f f f f f7bf
169) 08420842  e739f 7bf
170) e73a0000  0841f 7bf
171) f 7bde73a  f 7be0001
172) f f f fe73a  08420843
173) 00000000  f 7bde73b 174) f 7be0000  f 7bde73b
175) 08420000  e73a0843
176) f 7be0000  f f f fe73b
177) f 7bdf 7be  f 7be0843
178) 08420842  f 7be0843
179) f 7be0000  e739f 7bf
180) f f f ff 7be  e73a0001
181) 08420842  e73a0001
182) f f f fe73a  f 7be0843
183) f 7be0842  f 7bde73b
184) e739e73a  00000001
185) e739f 7be  0841f 7bf
186) f 7bdf 7be  f 7bde73b
187) f f f f e73a  08420001
188) 0841f 7be  08420001
189) f 7bdf 7be  e739f 7bf
190) 0841f 7be  08420843
191) 00000842  0841e73b
192) f f f ff 7be  e739f 7bf
193) 08420842  f 7bde73b
194) f 7be0842  00000843
195) f 7be0000  e739e73b
196) e739e73a  f f f ff 7bf
197) 00000842  e739f 7bf
198) f 7bde73a  08420843
199) e739f 7be  f f f f e73b
200) f 7be0000  e73a0001
201) f 7bdf 7be  e739e73b
202) 00000842  f 7be0843
203) e739f 7be  f 7bde73b
204) e73a0000  08420843
205) f 7bde73a  08420001
206) 00000000  18c60843
207) 00000001
208) f f f ff 7b f

FIG 3B (CONTINUED)

```
209) 00000843
210) ffffe73b
211) 000018c7
212) ffffce75
213) 0000318d
214) f7be0001
215) f7bdf7bf
216) f7be0843
217) f7bde73b
218) f7be18c7
219) f7bdce75
220) f7be318d
221) 08420001
222) 0841f7bf
223) 08420843
224) 0841e73b
225) 084218c7
226) 0841ce75
227) 0842318d
228) e73a0001
229) e739f7bf
230) e73a0843
231) e739e73b
232) e73a18c7
233) e739ce75
234) e73a318d
235) 18c60001
236) 18c5f7bf
237) 18c60843
238) 18c5e73b
239) 18c618c7
240) 18c5ce75
241) 18c6318d
242) ce740001
243) ce73f7bf
244) ce740843
245) ce73e73b
246) ce7418c7
247) ce73ce75
248) ce74318d
249) 318c0001
250) 318bf7bf
251) 318c0843
252) 318be73b
253) 318c18c7
254) 318bce75
255) 318c318d
```

END OF FIG 3B

| | | | |
|---|---|---|---|
| 0) | ( large delta pair follows ) | 35) | f 7ff f 800  00000000 f f fd ff ff |
| 1) | 00000000 00000000 00000000 00000001 | 36) | 08000800 00000000 f 7ff f 801 |
| 2) | f 7ff f 800  00000000 00000000 00000001 | 37) | 00020002 00000000 f f fd ff ff |
| 3) | f f fdf f fe  00000000 00000000 00000001 | 38) | f f fdf f fe  f f fdf f fe  00000001 |
| 4) | 00000000 f 7ff f800  00000000 00000001 | 39) | f f fdf f fe  00000000 f 7ff f 801 |
| 5) | 00000000 f f fdf f fe  00000000 00000001 | 40) | 00000000  f 7fd f 7fe 00000001 |
| 6) | 00000000 00000000 f 7ff f 800  00000001 | 41) | f 7ff f 800  00000000 00020003 |
| 7) | 00000000 00000000 f f fdf f fe  00000001 | 42) | 00000000 f f fdf f fe  f 7ff f 801 |
| 8) | 00000000 00000000 00000000 f 7ff f 801 | 43) | 00000000 00000000  f 7fd f 7ff |
| 9) | 00000000 00000000 00000000 f f fd ff ff | 44) | f 7ff f 800  00000000 f 7ff f 801 |
| 10) | 00000000 00000000 00000001 | 45) | f f fdf f fe  00000000 f f fd ff ff |
| 11) | f 7ff f 800  00000000 00000001 | 46) | 00000000 00000000 08020803 |
| 12) | f f fdf f fe  00000000 00000001 | 47) | 00020002 f f fdf f fe  f f fd ff ff |
| 13) | 00000000  f 7ff f 800 00000001 | 48) | f 7ff f 800  08000800 f 7ff f 801 |
| 14) | 00000000  f f fdf f fe  00000001 | 49) | f f fdf f fe  00020002 f f fd ff ff |
| 15) | 00000000 00000000 f f fd ff ff | 50) | 08000800  f 7ff f 800  f 7ff f 801 |
| 16) | 00000000 00000000 f 7ff f 801 | 51) | f f fdf f fe  00000000 08000801 |
| 17) | 00000000 00000000 00020003 | 52) | 00000000  f 7ff f 800  f f fd ff ff |
| 18) | 00000000 00000000 08000801 | 53) | 0 7fe0 7fe  f 7ff f 800  00000001 |
| 19) | 08000800 f 7ff f 800  00000001 | 54) | f 7ff f 800  00020002 f f fd ff ff |
| 20) | 00000000 00020002 f f fd ff ff | 55) | f 801f 802 f f fdf f fe  00000001 |
| 21) | 00000000 08000800 7 ff f 801 | 56) | f f fd f f fe  08000800  f 7ff f 801 |
| 22) | 00020002 f f fdf f fe  00000001 | 57) | f f fdf f fe  00020002 00000001 |
| 23) | f 7fd f 7fe 00000000 00000001 | 58) | f 7ff f 800  08000800 00000001 |
| 24) | 00000000 08000800 00000001 | 59) | 00000000  f 7ff f 800  00020003 |
| 25) | 00000000 00020002 00000001 | 60) | 00000000  f f fdf f fe  08000801 |
| 26) | 08000800 00000000 00000001 | 61) | 00000000  00020002 07fe0 7ff |
| 27) | f f fdf f fe  f 7ff f 800  00000001 | 62) | 00000000  00020002 08000801 |
| 28) | 00020002 00000000 00000001 | 63) | 00000000  00000000 f 801f 803 |
| 29) | f f fdf f fe  00000000 00020003 | 64) | 00000000  00000000 07fe0 7ff |
| 30) | f 7ff f 800  00000000 08000801 | 65) | 08000800  f 7fd f 7fe  00000001 |
| 31) | 00000000  f f fdf f fe  00020003 | 66) | 00000000  f f fdf f fe   f f fd ff ff |
| 32) | f 7ff f 800  f f fdf f fe  00000001 | | |
| 33) | 00000000  f 7ff f 800  08000801 | | |
| 34) | f 7ff f 800   f 7ff f 800 00000001 | | |

| | | | | | | |
|---|---|---|---|---|---|---|
| 67) | f 7fd f 7fe | f 7ff f 800 | 00000001 | 104) | f f fdf f fe | 00020003 |
| 68) | 00000000 | 08000800 | f 801f 803 | 105) | f 7fd f 7fe | 00020003 |
| 69) | 00000000 | 08000800 | f 7fd f 7ff | 106) | f 7fd f 7fe | f f fd ff ff |
| 70) | 08000800 | f 7ff f 800 | 00020003 | 107) | f 7ff f 800 | 08000801 |
| 71) | 00020002 | f f fdf f fe | 08000801 | 108) | 08000800 | f f fd ff ff |
| 72) | 00000000 | 08020802 | f 7fd f 7ff | 109) | 08020802 | f 7fd f 7ff |
| 73) | 00000000 | f 7ff f 800 | f 7ff f 801 | 110) | 00000000 | f 801f 803 |
| 74) | 00020002 | f 7fd f 7fe | 00000001 | 111) | 08000800 | f 7ff f 801 |
| 75) | 00000000 | 0 7fe0 7fe | f 7ff f 801 | 112) | 08020802 | f f fd ff ff |
| 76) | 00000000 | 00020002 | f f fbf f fd | 113) | f f fdf f fe | 08000801 |
| 77) | 08000800 | f 7ff f 800 | f f fd ff ff | 114) | 00000000 | 07fe0 7ff |
| 78) | 00000000 | f 801f 802 | f f fd ff ff | 115) | f 7ff f 800 | f 7fd f 7ff |
| 79) | f 7fd f 7fe | 00000001 | | 116) | 0 7fe0 7fe | f 7ff f 801 |
| 80) | 00000000 | 08020803 | | 117) | f 7ff f 800 | 08020803 |
| 81) | 08000800 | 00000001 | | 118) | 00020002 | f f fbf f fd |
| 82) | f f fdf f fe | f 7ff f 801 | | 119) | f 801f 802 | f f fd ff ff |
| 83) | 00020002 | 08000801 | | 120) | 08000800 | f 7fd f 7ff |
| 84) | 00000000 | 08000801 | | 121) | f 7fd f 7fe | f 7ff f 801 |
| 85) | 00020002 | 00000001 | | 122) | 08000800 | e fff f 001 |
| 86) | f 7ff f 800 | f f fd ff ff | | 123) | f 7fd f 7fe | 08000801 |
| 87) | 00000000 | f 7fd f 7ff | | 124) | 00020002 | f 7ff f 801 |
| 88) | 00020002 | f f fd ff ff | | 125) | 08020802 | f 7ff f 801 |
| 89) | 00020002 | 0 7fe0 7ff | | 126) | f 7fd f 7fe | f 7fd f 7ff |
| 90) | 00000000 | 00020003 | | 127) | e fff f 000 | 08000801 |
| 91) | 08000800 | 00020003 | | 128) | e fff f 000 | 00000001 |
| 92) | f f fdf f fe | f f fd ff ff | | 129) | f f fdf ff e | 08020803 |
| 93) | f 7ff f 800 | f 7ff f 801 | | 130) | f f fdf f fe | f 801f 803 |
| 94) | f 7ff f 800 | 00020003 | | 131) | 00020002 | f 7fd f 7ff |
| 95) | 08020802 | 00000001 | | 132) | f f fbf f fc | 00020003 |
| 96) | f 7ff f 800 | 00000001 | | 133) | f f fbf f fc | 00000001 |
| 97) | f f fdf f fe | 00000001 | | 134) | f 7ff f 800 | 0 7fe0 7ff |
| 98) | 0 7fe0 7fe | 00000001 | | 135) | f 801f 802 | 08000801 |
| 99) | f 801f 802 | 00000001 | | 136) | 00000000 | 00000001 |
| 100) | 00000000 | f 7ff f 801 | | 137) | f 801f 802 | 0 7fe0 7ff |
| 101) | 08000800 | f 801f 803 | | 138) | 0 7fe0 7fe | f 7fd f 7ff |
| 102) | f f fdf f fe | f 7fd f 7 ff | | | | |
| 103) | 00000000 | f f fd ff ff | | | | |

FIG 3C (CONTINUED)

| | | | | | | |
|---|---|---|---|---|---|---|
| 139) | 00020002 | 08020803 | | 176) | f f fdf f fe | e fff f 001 |
| 140) | f 7ff f 800 | f 801f 803 | | 177) | f 7fd f 7fe | 07fe0 7ff |
| 141) | e ffd e ffe | 00000001 | | 178) | 08020802 | 0 7fe0 7ff |
| 142) | 08000800 | 08000801 | | 179) | f f fdf f fe | f 7fb f 7fd |
| 143) | 00000000 | f f fbf f fd | | 180) | f 7ff f 800 | f f fbf f fd |
| 144) | 00020002 | 00020003 | | 181) | 08020802 | f f fbf f fd |
| 145) | 08020802 | 08000801 | | 182) | e fff f000 | 0 7fe 0 7ff |
| 146) | f f fdf f fe | 07fe0 7ff | | 183) | 0 7fe0 7fe | e ffd e f ff |
| 147) | 0 7fe0 7fe | 00020003 | | 184) | e ffb e ffc | 00000001 |
| 148) | 0 7fe0 7fe | f 801f 803 | | 185) | f 7fb f 7fc | f 801f 803 |
| 149) | f 7fd f 7fe | 08020803 | | 186) | f 7fd f 7fe | effd e f ff |
| 150) | 00000000 | e fff f 001 | | 187) | e fff f 000 | 00020003 |
| 151) | f 801f 802 | f 7fd f 7ff | | 188) | f 801f 802 | 00020003 |
| 152) | 08000800 | 08020803 | | 189) | f 7fd f 7fe | f 7fb f 7fd |
| 153) | e ffd e ffe | 08000801 | | 190) | f 801f 802 | 08020803 |
| 154) | 0 7fe0 7fe | e fff f 001 | | 191) | 08000800 | f 001 f 003 |
| 155) | 08020802 | 00020003 | | 192) | f 7ff f 800 | f 7fb f 7fd |
| 156) | 08020802 | 08020803 | | 193) | 08020802 | e ffd e f ff |
| 157) | 08000800 | e ffd e fff | | 194) | 0 7fe0 7fe | 08000801 |
| 158) | f 7fb f 7fc | 00020003 | | 195) | f f fdf f fe | effb e ffd |
| 159) | f f fbf f fc | f 7ff f 801 | | 196) | e ffb e ffc | f 7ff f 801 |
| 160) | f 7fd f 7fe | f 801f 803 | | 197) | 08000800 | f 7fb f 7fd |
| 161) | 00000000 | f 7fb f 7fd | | 198) | e ffd effe | 08020803 |
| 162) | 0 7fe0 7fe | f f fd ff ff | | 199) | f 7fb f 7fc | e fff f 001 |
| 163) | f 801f 802 | f f fbf f fd | | 200) | f f fdf ff e | f f fbf f fd |
| 164) | f 7fb f 7fc | 00000001 | | 201) | f 7fd f 7fe | e ffb e ffd |
| 165) | f 7fb f 7fc | f 7ff f 801 | | 202) | 08000800 | 0 7fe0 7 ff |
| 166) | 00020002 | f 7fb f 7fd | | 203) | f 7fb f 7fc | e ffd e f ff |
| 167) | e fff f 000 | f f fd ff ff | | 204) | f f fbf f fc | 08020803 |
| 168) | f 801f 802 | f 7ff f 801 | | 205) | e ffd e ffe | 00020003 |
| 169) | 08020802 | f 7fb f 7fd | | 206) | 00000000 | 08060807 |
| 170) | f f fbf f fc | f 801f 803 | | 207) | 00000001 | |
| 171) | e ffd e ffe | f f fd ff ff | | 208) | f 7ff f 801 | |
| 172) | e fff f 000 | 08020803 | | 209) | 08000801 | |
| 173) | 00000000 | e ffd e fff | | 210) | e fff f 001 | |
| 174) | f f fdf f fe | e ffd e fff | | | | |
| 175) | 00020002 | 0 7fc0 7fd | | | | |

FIG 3C (CONTINUED)

211) 1800 1801
212) d fff e001
213) 2800 2801
214) f ffd f ff
215) f 7fd f 7ff
216) 0 7fe0 7ff
217) e ffd e f ff
218) 1 7fe1 7ff
219) d ffdd f ff
220) 2 7fe2 7ff
221) 0002 0003
222) f801 f803
223) 0802 0803
224) f001 f003
225) 1802 1803
226) e001 e003
227) 2802 2803
228) f f fbf f fd
229) f 7fb f 7fd
230) 0 7fc0 7fd
231) e ffb e ffd
232) 1 7fc1 7fd
233) d ffb d ffd
234) 2 7fc2 7fd
235) 0006 0007
236) f805 f807
237) 0806 0807
238) f005 f007
239) 1806 1807
240) e005 e007
241) 2806 2807
242) f ff7 f ff9
243) f 7f7 f 7f9
244) 07f8 07f9
245) e ff7 e ff9
246) 17f8 17f9
247) dff7 dff9
248) 27f8 27f9
249) 000a 000b
250) f809 f80b
251) 080a 080b
252) f009 f00b
253) 180a 180b
254) e009 e00b
255) 280a 280b

END OF FIG 3C

| SMALL DELTAS: | LARGE DELTAS: | S (SYMBOL) |
|---|---|---|
| 0 | 0 | 0 |
| −1 | −5 | 1 |
| 2 | 10 | 2 |
| −3 | −15 | 3 |
| 4 | 20 | 4 |
| −6 | −30 | 5 |
| 6 | 30 | 6 |

*FIG. 5A*

| SMALL DELTAS: | LARGE DELTAS: | S (SYMBOL) |
|---|---|---|
| 0 | 0 | 0 |
| −1 | −5 | 1 |
| 1 | 5 | 2 |
| −2 | −10 | 3 |
| 3 | 15 | 4 |
| −4 | −20 | 5 |
| 5 | 25 | 6 |

*FIG. 5B*

DATA COMPRESSION APPARATUS AND METHOD

RELATED APPLICATIONS

This application is a continuation of application Ser. No. 08/402,952 filed Mar. 10, 1995, now abandoned which is a continuation-in-part of U.S. application Ser. No. 08/060,613 filed on May 12, 1993 (pending), the disclosure of which is incorporated herein by reference. The present application claims all rights of priority of the parent application.

BACKGROUND OF THE INVENTION

The invention relates generally to a method of and apparatus for coding and compressing information. More specifically, the invention relates to a method for coding and compressing digital signal data, such as digitized video images, for storage and transmission. While the following discussion refers to compression of digitized video images, it is to be understood that the invention is not restricted to video data, and may produce benefits in other fields where compression is used.

As the digital revolution has spread to many industries and technologies, the need to transmit, store and manipulate large amounts of data has grown. Consequently, there have been many attempts to code and/or compress data in order to reduce the necessary storage capacity, transmission rate, and processing speed to perform a given task.

For example, one of the fields that has recently developed a need for intensive digital data handling is video technology. This field includes applications such as the transmission of real time video over telephone lines for teleconferencing and the use of digital video-transmission for home television viewing as well as interactive television and computer applications. Presently, there are limitations imposed by the quality and available bandwidth of existing transmission lines as well as capacity of storage devices necessary to store and transmit image data.

To reduce the data capacity requirements of such video systems and/or improve performance of systems with limited data capacity, various methods have been devised. So-called "lossless" compression methods rely on redundancies within the data, for instance by assigning a single code to represent an entire block of data that may repeat several times. Other methods are considered "lossy," because some of the data is lost in the compression/decompression process resulting in images that differ from the originals. Both methods are useful and practical and are commonly used together to create an effective compression system.

In the compression of video images, known lossy techniques produce undesirable effects in the final decompressed image, such as pixellation and posterization. These undesirable effects are known as 'artifacts'. Pixellation occurs when the number of stored pixels is reduced for the total image, i.e., the resolution is decreased, leading to jagged lines and squared-off curves. Posterization occurs when the number of values representing pixel brightness and color is reduced. For example, typical digitized monochrome video images normally have 256 shades of gray. If that number is reduced to 16 or 32 for the same image, areas with smooth shading gradations now have regions of uniform shade, and transitions from one shade to the next are obvious. Other lossy techniques, such as using a low-pass filter to eliminate high-frequency noise, also eliminate the high-frequency portion of the image, making it muddy and lacking in detail.

To better preserve the quality of the image, others have applied lossless compression methods. However, when the process necessarily includes analog components (cameras, tape equipment, etc.), these methods are overkill. Any analog component, even the analog-to-digital (A/D) converters used to digitize an image, will add a certain amount of noise to the digital data captured, and this amount of noise varies from system to system. Lossless compression methods compress, transmit and decompress this noise accurately, along with the "good" data, at great expense in storage and processing requirements. Some complex and noisy images can even be larger in their "compressed" form than when not compressed with some methods. Unfortunately, there is no obvious way to determine what is noise and what is data once the digital signal is produced; to the system, it is all data. It is possible, although complicated, to use various forms of "dithering" with filtered data to add a somewhat random or pseudo-random aspect to the reproduced image, hopefully ameliorating some of the effects of filtering and posterization. Often, these methods involve the addition of a separate machine generated random signal during compression and/or decompression. Of course, this requires many additional components and method steps, driving up the costs and slowing down maximum processing speeds.

One relatively simple compression scheme well known in the art is called "delta encoding". Although primarily used in compression of digitized audio signals, several attempts have been made to apply the principle to the compression of image data. In delta encoding, a series of data values are encoded as a first value and a series of differences, or deltas, between each value and the next subsequent value. Delta encoding holds advantages when used in conjunction with lossless compression means such as Huffman coding, known in the art, which take advantage of the statistical frequency of values in a series to achieve data compression. The advantage of delta encoding arises from the fact that the frequency distribution of the differences between subsequent values in a series is often much less uniform than the distribution of the actual values, and in many cases this provides substantial gain in the compression of such data.

So far, what has been described with delta encoding is a lossless compression method, in that the decoded values will be identical to the encoded values. Limiting the allowable delta values which can be encoded to a subset of the possible delta values comprises a 'lossy' compression process known as delta quantization. The quantizing function must include a means of choosing one of the allowable deltas if the actual delta is not equal to any of them; a simple and effective rule is to choose the allowable delta closest to the actual delta. It should be noted that when using delta quantization, the error, or difference between the input pixel value and the corresponding decoded value, must be added into the next delta prior to quantization; this error is therefore being incorporated into subsequently processed pixel values, which is to say the error is being distributed in the direction corresponding to pixel processing. An equivalent way of achieving this is to produce each delta not by taking the difference between subsequent pixel values in the original image, but by taking the difference between the present pixel value and the last decoded pixel value, which is often maintained anyway by the compression apparatus for reference display.

Drawbacks of delta quantization particularly as applied to images are: reduced spatial frequency response, posterization, and edge artifacts. Frequency response is dependent on the size of the largest allowable delta values; posterization results from the choice of the smallest values; and edge artifacts result from both of these factors as well as from the fact that previous delta encoding schemes distribute error in a single spatial dimension.

Furthermore, the existence of substantial noise elements introduced by the analog components of the video process (including grain from film sources) reduces the ability of delta encoding to produce an image of acceptable quality along with substantial data compression. The reason for this is that noise manifests itself primarily in the high-frequency domain, which creates a wide distribution of small differentials between subsequent data values. The designer of a digital video compression system using delta quantization techniques is faced with a dilemma: either allow a large number of small delta values to be used, resulting in less compression, or accept noticeable edge and posterization artifacts. For this reason, delta encoding for video compression has been limited to use in situations where the level of compression needed is small, or where image quality is not of paramount importance (certain computer applications).

Typically, where high levels of compression must be achieved, along with superior video quality, more complicated means have been pursued, including discrete cosine transform, vector quantization, wavelet, and other techniques known in the art. In addition, some compression systems as described above which aim at high levels of compression use inter-frame and motion estimation techniques, which further increase complexity and cost.

A brief summary of the features of such complicated means is set forth:

Vector Quantization (VQ). A highly time asymmetrical algorithm often used on PCs. Results in poor quality video, although hardware to play it back can be produced cheaply. Several proponents of VQ have given up on this technology.

Fractal Compression The picture quality is poor, it is even more time asymmetrical than VQ, and the complexity of decompression makes this likely to be too slow to run video.

Wavelets This technology is capable of good quality video and is fairly time symmetrical, although it is very complex on the decompression side. Several problems with this technology forced at least one company developing it to drop it.

Discrete Cosine Transform This is the core of the JPEG still image standard and the elusive MPEG standard. Although very complicated, this algorithm is time symmetrical and results in reasonable quality video. Artifacts inherent in this scheme, however, are usually obvious and annoying.

MPEG. This is a version of DCT with bidirectional motion estimation. It is very complicated, highly asymmetrical and will have digital artifacts.

VQ is undesirable on the quality basis. The rest of the above technologies are simply too expensive. A reasonable implementation of the MPEG standard will require 3 million gates. A chip of this complexity is equivalent to the Intel Pentium or the DEC Alpha. Given typical yields, a 3 million gate chip is very expensive to design and manufacture.

The problems associated with noise are not solved by these systems; they merely manifest themselves in other ways than with delta encoding schemes. Complex filtering processes and quantization of frequency components can increase compression levels by reducing noise, but often create artificial-looking results and introduce artifacts such as texture baldness. Inter-frame and motion estimation techniques exacerbate the problem, causing artifacts such as blockiness and frozen noise.

SUMMARY OF THE INVENTION

It is the object of this invention to provide a digital video compression process that provides superior image quality with high levels of compression and is simple and cost-effective to implement and manufacture. Rather than use complex mathematical techniques which require equally complex apparatus to implement, and which, in the opinion of many in the business of producing and distributing recorded and transmitted video material, produce unacceptable results at prohibitive cost, the inventors have combined a novel form of delta encoding with a method of image analysis to create a process that closely approximates the characteristic appearance of analog image processes, especially film. In this way, the visual effect of the compression process is similar, and perhaps superior to, the effects of the analog process being replaced, whether it be video tape recording, motion picture film, or video transmission via broadcast or other means. Further, the compression and decompression processes can be performed relatively quickly so as to yield real time "on the fly" digital compression and decompression.

Among the important features of the invention is that the simplicity of the compression/decompression system allows for the system to be implemented on a customized ASIC. The benefits are easily visualized. Based on this approach, an advantage of the present invention is that it can be implemented on a low cost custom ASIC, which could be installed in consumer products. Indeed, the present system can be implemented using less than 100,000 gates on a simple chip which is very inexpensive to fabricate.

In accordance with an object of the invention, a method of analysis of the analog components of the video pathway is provided, including the analog-to-digital and digital-to-analog circuits used, enabling the designer of the system to establish an effective range of possible decoded values for given encoded values, termed the Decoding Range, relating to the noise level inherent in the system.

Also in accordance with another object of the invention, a method and apparatus is disclosed which incorporates a novel form of delta encoding, utilizing parameters based on the Decoding Range to introduce a pseudo-random element to the decoded values while maintaining these values within the Decoding Range. Two novel elements of the encoding process which were described in the parent application are named Asymmetric Delta Quantization and Two-Dimensional Delta Encoding. These two elements may be used separately or in conjunction to satisfy the objects of the invention. To elucidate the description of the invention, there follows a general overview of these two novel elements.

Asymmetric Delta Quantization is similar to Delta Quantization, except that certain of the allowable deltas have different magnitudes when they are negative than the corresponding positive values. This introduces the pseudo-random element. Typically, the magnitude of the two smallest delta values allowed will differ by 1, such as −2 and +1, or −3 and +2, corresponding to a Decoding Range of 3 or 5 respectively. Asymmetric Delta Quantization includes the added benefit that the unequal delta values are chosen with non-uniform frequency, which can increase the compression level of subsequent lossless compression.

Asymmetric delta encoding may be described in more detail as follows. In order to reduce the data transmitted, a fixed value, such as +2, is transmitted for every delta falling in the range of 0 to +5 (See FIG. 5). Similarly, the fixed value +8 will be transmitted for each delta falling in the range of greater than +5 and less than or equal to +14. In the traditional delta encoding process, identical fixed negative and positive values would be transmitted when the deltas fall in the respective negative and positive ranges. With the present invention, the lowest positive and negative output codes representing the lowest corresponding positive and negative ranges are unequal and preferably are different by an integer value of one.

Two-Dimensional Delta Encoding expands the concept of delta encoding to include both horizontal and vertical axes. (Alternatively, one dimension could be temporal.) To perform delta encoding in both axes simultaneously, we generate a quantity called the Vertical Differential. The Vertical Differential shall be the difference between a given input pixel value, and the decoded pixel value directly above it. We then perform delta encoding on subsequent Vertical Differentials from left to right for each row of pixels. To begin the process, we must record without compression the value of the first row of pixels and the first pixel value of each subsequent row. (Alternatively, we can initialize the first row and column to a fixed value, as described for the Representative Embodiment.) By maintaining the value of the decoded pixels for each previous row, we effectively distribute error downwards as well as to the right (as explained earlier in regard to delta quantization, deriving deltas using decoded values for previous pixels is equivalent to incorporating an error term). In fact, it can be shown that Two-Dimensional Delta Encoding with subsequent delta quantization causes error to be distributed in both vertical and horizontal dimensions on a random basis with each pixel, creating a film-like granular look which is preferable to the unnatural effect of delta encoding in one spatial dimension. This effect is enhanced if Asymmetric Delta Quantization is employed. It can also be shown that Two-Dimensional Delta Encoding is equivalent in both dimensions; the same result is obtained whether we process from left to right in each subsequent row, or choose to process each column from top to bottom—neither axis is preferred or emphasized in any way.

The following novel elements of the present invention are based on encoding of images using RGB encoding, where each pixel is represented by individual red, green and blue components. This form of image representation is the most common in consumer display devices which display digital images on a monitor or television screen.

One novel element of the present invention is the ability to encode RGB pixels such that during the decode process, the individual R, G and B fields can be generated in a single operation. Integer wrap-around of the R, G and B fields is avoided so that standard subtraction and addition operations can be employed to operate on the three individual elements of each pixel value simultaneously.

If registers capable of containing multiple pixels are available, the same method can be applied to the encoding of multiple pixels, producing that number of pixels during decode, in a single operation. The encoding process ensures that no overflow conditions are ever possible at decode time for any of the individual R, G or B fields contained in any of the pixels which are simultaneously encoded in this manner.

Two aspects of the present invention relate to the avoidance of overflow conditions within the separate fields inside pixels containing multiple individual components, such as RGB pixels. They are Encoding Lookahead and Large Deltas.

The method of Encoding Lookahead is to modify the process by which a delta is selected for the encoding of a particular pixel, based on the effect that selected delta will have on the encoding of some predefined number of subsequent adjacent pixels. In this way, to the extent possible, a pixel will be encoded such that for a predefined number of subsequent adjacent pixels, there exists at least one series of deltas which will prevent overflow of any component fields within those pixels.

The method of Large Deltas allows for an alternate set of deltas which are larger than the normal deltas to be invoked as necessary, in order to prevent overflow of any fields within the pixel being encoded. Large Deltas also allows for an improvement in the accuracy of the encoded image in that the method introduces the ability to greatly reduce quantization error of pixels so encoded. There is a modest cost in terms of data rate in invoking Large Deltas, which in practice occurs infrequently enough as to be outweighed by its ability to enhance the encoding process.

Another novel element of the present invention concerns the manipulation of color images. Previous schemes, including that cited in the parent application, have used the so-called Y, V, U colorspace of luminance and chromanance values to represent and manipulate images. The present invention uses a simplified color scheme of Luminance, Red-Green, and Blue-Green where Luminance represents the weighted addition of Red, Green and Blue, Red-Green the difference between Red and Green and Blue-Green the difference between Blue and Green. The Red-Green and Blue-Green components are sub-sampled at $\frac{1}{16}$ resolution, representing average color differences over 4×4 pixel blocks. First the Red-Green and Blue-Green components are encoded using simple Two-Dimensional Delta Encoding. When the Luminance information is encoded, previously encoded Red-Green and Blue-Green deltas are interjected into the data stream at the boundaries of 4×4 pixel blocks so that the sub-sampled color information can be reconstituted during decoding. Thus, encoding generates two types of deltas, Luminance Deltas and Color Deltas. During decode, Luminance Deltas operate on the Red, Green and Blue components of the pixel being decoded in unison. When Color Deltas appear in the data stream, only the Red and Blue components of the pixel being decoded are affected. By modifying the Red-Green and Blue-Green relationships at 4×4 pixel block boundaries, a single decoding pass generates both the Luminance and Chromanance components of the decoded image.

In the representative embodiment of the present invention, there are two types of encoded images: Keyframe and Interframe. In Keyframe images, all pixels are encoded as described. In Interframe images, every 4×4 pixel block is one of two types: Fully Encoded (FE) or Interframe (IF). FE blocks are encoded and decoded exactly as described for Keyframe images. IF blocks are skipped; that is, the pixels of the previous image in the video stream at the same block location are retained. In Keyframe images, all blocks are Fully Encoded (FE).

A novel element of the present invention which relates to Interframe compression is called Keyrows. Interframe compression methods have traditionally suffered from the fact that since interframe frames are dependent on other frames, usually the previous one, playback can only begin at a keyframe (fully encoded frame). Keyrows is a novel partial solution to this problem which takes advantage of the fact that Two-Dimensional Delta Encoding will reproduce correct information whenever the pixels above and to the left of the pixel being decoded are correct. The method of Keyrows is as follows. In every Interframe compressed frame a row of 4×4 pixel blocks is designated as a Keyrow and only FE blocks are encoded for that row. In each subsequent frame, the row 4 pixels below the previous Keyrow is chosen. Even in the absence of any Keyframes, playback may begin at any frame. Within a set period dependent on the framerate and image height, the decoded frames are guaranteed to be free of defects.

Another novel element of the present invention is called String Encoding. String Encoding is a statistical method of encoding that works in conjunction with the other elements described to further compress the data representing video images. String Encoding uses a best-match search method to represent variable length strings of symbols with other variable length strings in a fashion that allows near-optimal compression ratios and optimized playback performance.

BRIEF DESCRIPTION OF THE DRAWINGS

The foregoing and other objects, features and advantages of the present invention will become apparent to those skilled in the art upon reading the following detailed description in conjunction with the appended drawings, in which:

FIG. 2B is a representative Symbol-to-String Encoder Table;

FIG. 3B is a representative String-to-Delta Decoder Table;

FIG. 5A and FIG. 5b are the Luminance and Chromanance Asymmetric Quantization and Symbol Tables;

DETAILED DESCRIPTION OF THE REPRESENTATIVE EMBODIMENT

For explanatory purposes, and for the purpose of standardizing the overall detailed description of the Representative Embodiment, the analog input signal will be considered a full bandwidth Red, Green and Blue color video signal, converted into a stream of digital values from a set of 32 possible values, i.e., there are 32 intensity levels for each of the three primary colors for each pixel or sample in the video image. It will be further understood that the signal preferably does not contain the video information necessary for the maintenance of the video signal, such as timing and synchronization signals. These signals would be removed before compression, and generated locally during decompression. The present invention is concerned with the data portion of the signal or the portion that determines the brightness and color at each pixel or sample. It should also be understood that the present invention is not limited to video signals, but can be applied to any analog or digital signal, although certain aspects of the present invention find great advantage for video signals.

The preferred embodiment is fully disclosed in the accompanying computer program listing, which is fully functional compression and decompression software embodying all elements claimed in this application. The following outlines the basic functionality of the invention.

The present invention, in its representative embodiment, represents these digitized video images using RGB555 encoding, which allocates 5 bits of data each for the red, green, and blue image components. The resulting 15 bits may be manipulated using standard integrated circuit microprocessor technology, which typically use 16-bit or 32-bit registers. If 32-bit registers are available, the present invention may operate on pairs of pixels, producing twice the number of pixels per operation. The representative embodiment assumes implementation using 32-bit registers.

Figure 1:
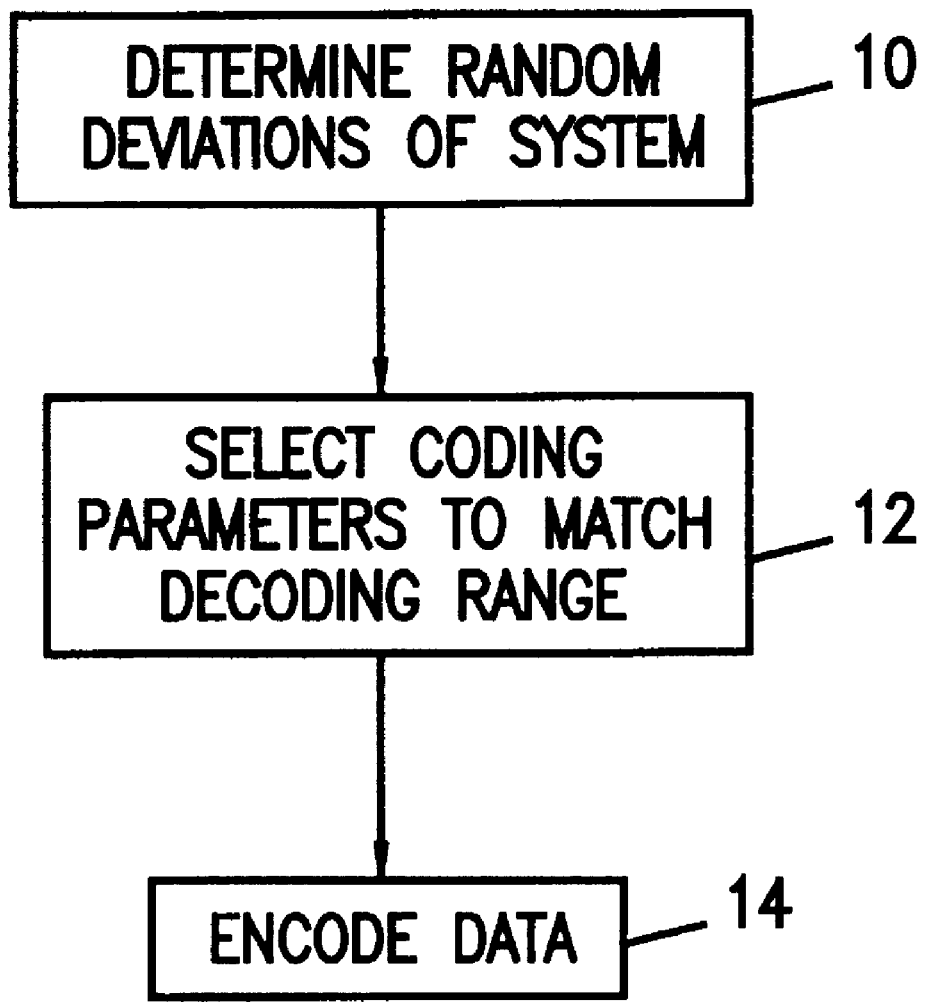
FIG. 1 is a schematic flow chart of a method according to the present invention.

Referring now to the drawings, FIG. 1 shows some of the general processes that are used in the practice of the Representative Embodiment of the invention. Initially, it is necessary to determine the noise level, or random deviation, inherent to the particular analog system in use (block 10). There are known methods to determine this deviation, such as by imaging a flat card of one continuous shade. In a perfect system, the digitized values would all be the same for the entire video frame; by analyzing the actual sampled values, the random deviation can be determined. For example, if the average sampled value were 100, the individual samples might represent a range of 98 to 102, resulting in a random deviation of +/−2. This random deviation indicates the acceptable range within which a sample value must be decoded to avoid a noticeable increase in the noise level of the image. This decoding range supplied to a system (12) which is used to select coding method parameters to match the random deviation of the system (block 12). The output of system 12 is supplied to data encoded block 14, so that these parameters are then used to compress the data in block 14.

In this representative embodiment, each pixel is digitized in RGB555 format; that is, there are 5 bits for red, green, and blue corresponding to each pixel. Furthermore, pixel pairs are acted upon in parallel by the use of 32-bit registers. The pixel format within such a register is as follows:

```
31 30 29 28 27 26 25 24 23 22 21 20 19 18 17 16 15 14 13 12 11 10 9 8 7 6 5 4 3 2 1 0
|---|----red 2-----------| -----green 2-------|-----blue 2--------- |---| ----red 1-----------|--green 1----|---blue 1-
```

Figure 2:
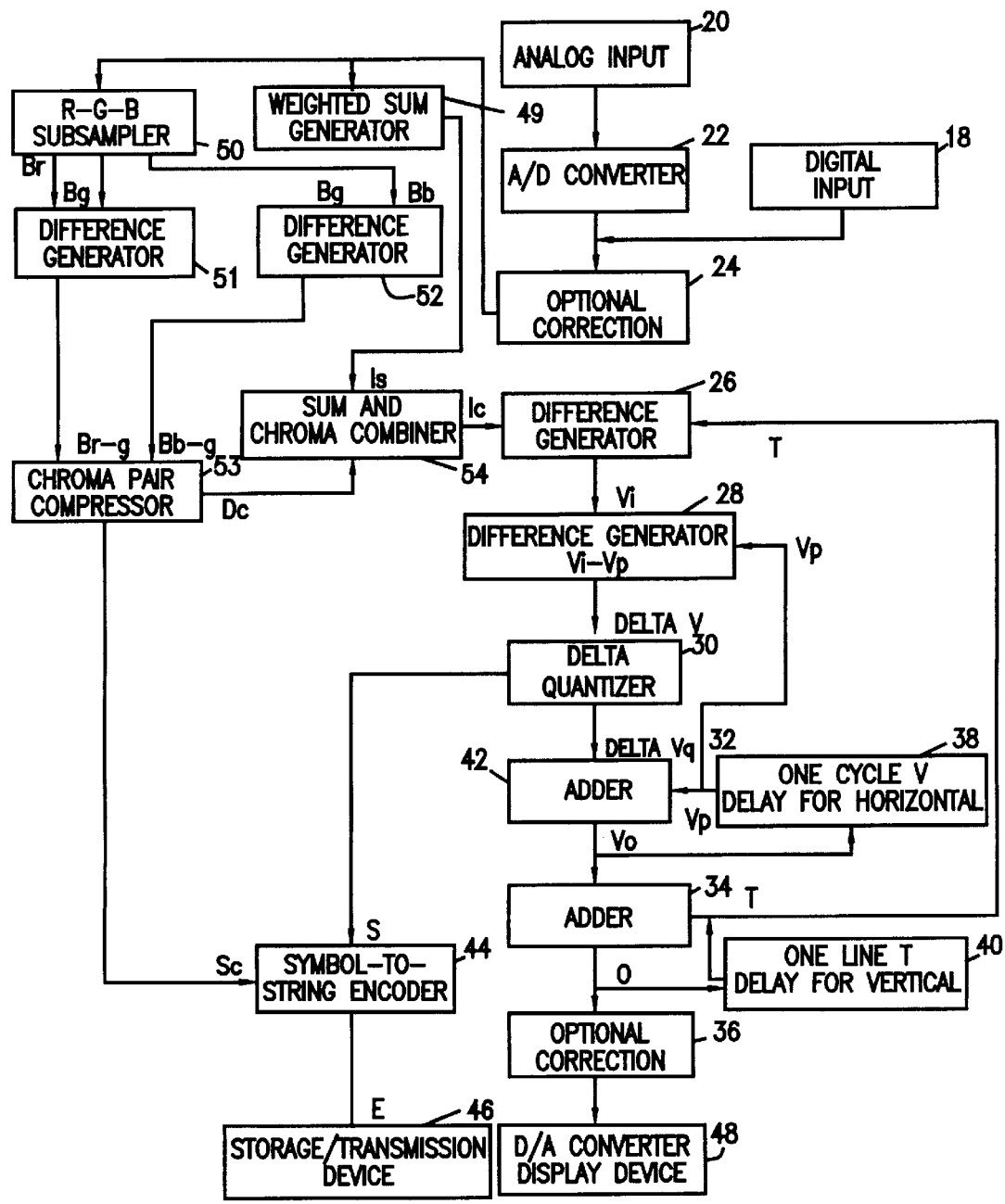
FIG. 2 is a block diagram of a compression system according to the present invention, and FIG. 2A identifies certain values which are produced in the system of FIG. 2.

FIG. 2 shows a schematic functional block diagram of a compression system for performing the method of a Representative Embodiment of the present invention and Table 2A lists the values to be generated by the system of FIG. 2. The image is processed starting with the top leftmost pair of pixels in the image, moving left to right for each row (or line) of pixels, and down each row until all pixels have been processed. All operations are performed on 32-bit quantities and generate pairs of pixels. There are two time delay blocks, one for the previous pair of pixels (block 38) and one for the previous line (block 40). These are pre-initialized to a fixed value of R=16, G=16, B=16 (a neutral grey).

Initially, a video signal containing data is input in some form (block 20), such as a camera, but it could be from any known source, such as a film scanner or from videotape. The signal is then digitized by an analog-to-digital converter (block 22). The input signal could also originate at this point from a digital source such as computer-generated animation sequences. At block 24, a logarithmic or other correction can be performed on each pixel so that the random deviation will be constant over the entire range of possible pixel values. The result of this correction we call I, the Input pixel-pair value.

At block 49, the R, G and B components of each pixel of pixel-pair I are summed together. This is done in a weighted fashion, in order to compensate for the relative sensitivity of the human visual system to these primary colors, with G at 1/2, R at 7/24 and B at 5/24. At block 50 the R, G and B components of Input pixel-pair values are subsampled on a block basis. Typically blocks sizes of 4×4, 4×2, 2×4 and 2×2 pixels are utilized. The processing is basically the same whichever block size is selected. Block 50 generates one set of subsampled values for each block, Br, Bg and Bb.

At blocks 51 and 52 differences are generated between Br and Bg, and Bb and Bg, respectively. These block based differences, Br-g and Bb-g, are then compressed using Two-Dimensional Delta Encoding at block 53 (Chroma Pair Compressor), in a manner similar to compressing a pixel pair, generating Dc (Chroma pair Delta). Dc is combined at block 54 with weighted sum Is at the upper left corner of each block boundary (at other pixel locations, block 54 just passes along Is unchanged), producing Ic.

Block 53 also produces Sc (Chroma Symbols), which are derived from the table in FIG. 5B (Chroma Delta Quantization Table). At block 44, Sc is interleaved into the Encoded Symbol stream (at the upper left corner of each block boundary).

At difference generator block 26, a difference is generated by subtracting T (the Top pixel-pair value, which is output by the one-line delay at a block 40) from Ic. The one line delay relates to the generation of vertical delta values. This quantity is called Vi (Vertical input differential). At difference generator block 28, Vp (Vertical previous differential, output by the one cycle delay at block 38) is subtracted from Vi to generate ΔV (delta-Vertical differential).

At block 30, ΔV is quantized using Asymmetric Delta Quantization, utilizing the parameters generated at block 12, of FIG. 1. This is accomplished by providing the actual ΔV to coding parameter block 12 which produces an output determined by comparing the ΔV field of each pixel in a pixel-pair to the list of possible deltas in the left column of FIG. 5A. A delta is chosen from the Small Deltas column with a minimum absolute value difference from the corresponding ΔV field. If this difference is larger than a predetermined threshold, or if the resultant Small Delta would cause a field overflow condition, then all possible combinations of Small Deltas and Large Deltas in FIG. 5A are compared to the ΔV field, and the combination with the minimum absolute value difference is chosen. This process is repeated for the second pixel of the pixel-pair. If either pixel requires a Large Delta, and the other pixel in the pair does not, the other pixel takes a Large Delta of 0. At this point, then, both pixels require a Small Delta and a Large Delta to be encoded. The symbols for the Small Deltas for the pixel-pair are inserted in the symbol stream, followed by a pair of illegal symbols (−1, −1), followed by the symbols for the Large Deltas. These S values (the symbol stream) are then sent to the Symbol-to-String Encoder, block 44. The deltas chosen are combined, by adding their values shifted into the appropriate Red, Green and Blue fields for each of the two pixels, into the value ΔVq (delta-Vertical, quantized). If Large Deltas were used, these are similarly added into ΔVq.

The value ΔVq is supplied to adder block 32. Block 32 sums Vp and ΔVq, generating Vo (Vertical output differential). At adder block 34, Vo is summed with T to produce O (Output pixel-pair). Vo is also supplied to block 38, the one cycle delay, for storage until the next horizontal pixel-pair is processed. At block 40 (the one-line delay), O is stored for processing the next row of pixels. If a correction took place at block 24, an inverse correction is performed on O at optional correction block 36. The output is then sent to a Digital-to-Analog converter block 48 for display on a video monitor.

Further lossless compression occurs at lossless Symbol-to-String encoder block 44. The symbol stream S is matched against the strings in FIG. 2B. The index corresponding to the longest matching string is encoded in binary form as E, the Encoded bitstream, and sent to block 46, Storage/Transmission device. A pair of illegal symbols (−1, −1) serves to limit the length of the previously chosen string. An index of 0 is then inserted into the Encoded Bitstream, and the encoding begins again at the next symbol.

At storage/transmission device (block 46), the encoded bit stream is saved to a storage device. Alternatively, the bit stream E could be transmitted for real-time video applications such as television transmission or teleconferencing.

Figure 3:
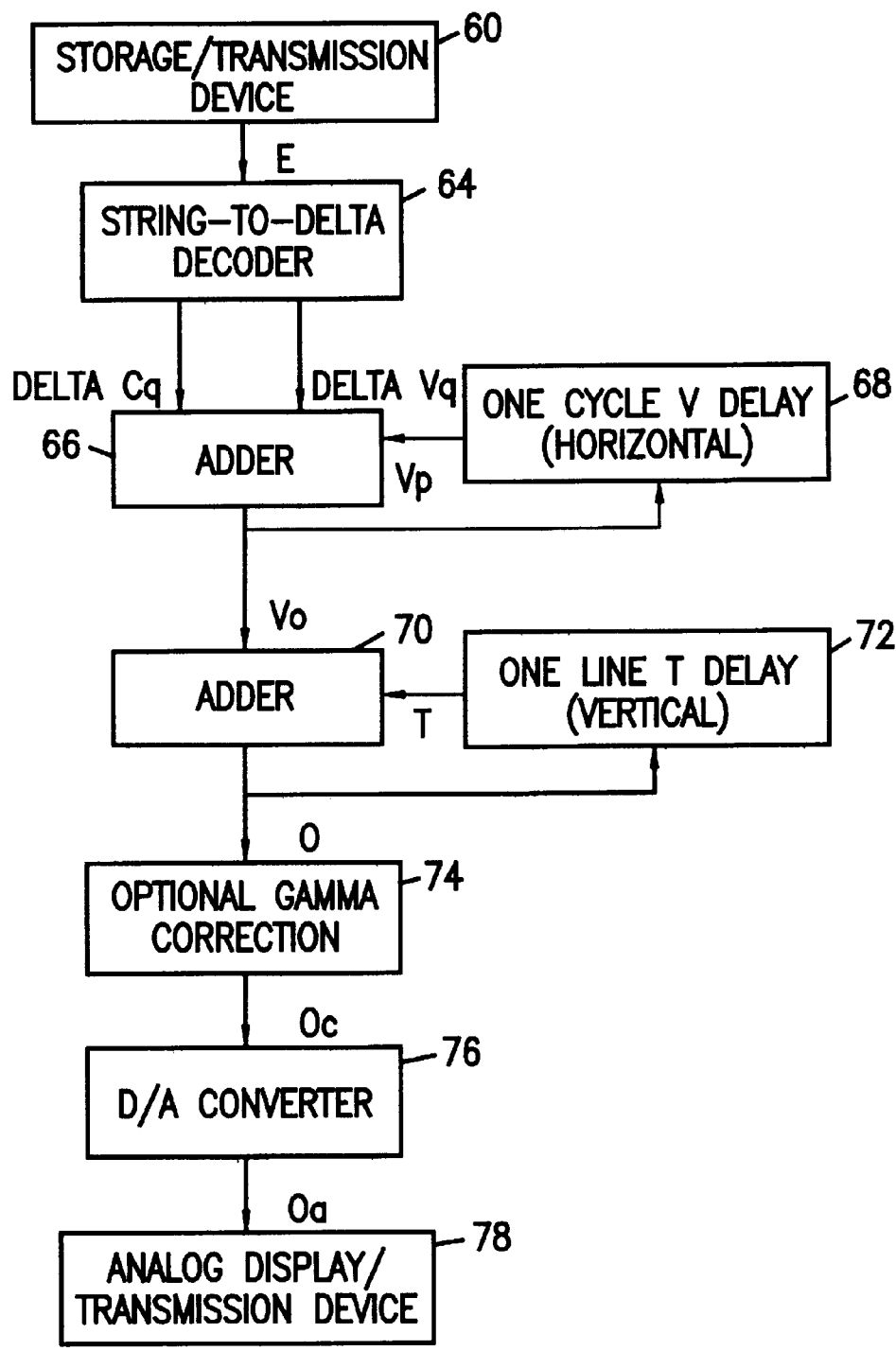
FIG. 3 is a block diagram of a decompression system according to the present invention, and Table 3A identifies certain values which are produced in the system of FIG. 3.

FIG. 3 shows a schematic functional block diagram of a decompression system utilizing the method of a Representative Embodiment of the present invention, and Table 3A lists a table of coded values which are generated at different locations on the block diagram of FIG. 3. As in compression, the image is processed starting with the top left pixel-pair, moving left to right and down each row until all pixel-pairs have been decompressed. The two delay blocks at 68 and 72 are pre-initialized to the same value used in compression (RGB 16,16,16).

At storage/transmission device 60, the encoded bit stream E is retrieved from a storage device and supplied to lossless decoder 64. Alternatively, the bitstream could come from a data reception device in a real-time video transmission system. In either case, at lossless decoder block 64, the bitstream is treated as a series of 8-bit 'bytes' corresponding to index numbers from 0 to 255. These indexes correspond to the symbol strings used in the Symbol-to-String Encoder, FIG. 2, block 44. In FIG. 3B, a representative String-To-Delta Decoder Table is shown. This table is used to decode material encoded with the encoding table in FIG. 2B. Each value (printed in hexadecimal notation) in the table corresponds to two encoded symbols (from 0 to 6). Each symbol corresponds to either a luminance delta as listed in FIG. 5A., or a chromanance delta as listed in FIG. 5B.

Assuming 4×4 color block subsampling was used during encoding, a pair of chromanance deltas, will be present in the data stream at the top left corner of every 4×4 block of pixels. Chromanance deltas, dCq are retrieved from the table in FIG. 3C and presented to Adder (66), where they are added to ΔVq and Vp. Again, this only occurs at the top left corner of each 4×4 block of pixels. At all other pixel locations, Adder (66) simply adds ΔVq and Vp.

For maximum efficiency during the decode process, delta values for the luminance information for every color field of each pixel in every pixel pair are shifted and added together, and the resulting 32-bit signed integer value is used in the decode table. For example, index 230 in the encode table (FIG. 2B) indicates that the symbols 2 and 3 encode for two pixels, which make up a pixel pair. Looking at FIG. 5A, we can see that these symbols correspond to luminance deltas 2 and −3 respectively. When index 230 is encountered in the decoding process, we wish to add 2 to every color field for pixel 1 in the vertical delta register (Vp), and −3 to every field corresponding to pixel 2. In the format chosen to represent pixel pairs in 32-bit registers, we can see that this requires us to add 1 into the Vp register at bit positions 0, 5, and 10 (blue, green, and red), and to add −3 at bit positions 16, 21, and 26. However, we need a way to encode whether the string of delta pairs at a given position in the table is the end of a string. We do this by shifting the whole sum left by one bit position, and using bit 0 to encode the end-of-string condition. The table entry for index 230 should equal, then, (in C programming notation):

entry=((2+(2<<5)+(2<<10)+(−3<<16)+(−3<<21)+(−3<<26))<<1)+1:

this value computes to (in hexadecimal) the number e73a1085, which is the single entry under index 230 in the decode table (FIG. 3B).

The chroma String to Delta Decoding table (FIG. 3C) is constructed in a similar fashion to the luma String to Delta Decoding table (FIG. 3B). Since chroma deltas only affect R and B components, each 32 bit entry in the table in FIG. 3C contains red and blue deltas shifted into the two red fields and the two blue fields contained in that 32 bit register.

The encoded bitstream is treated as a series of indexes into this table of 32-bit delta-pair values. The delta-pair is shifted to the right by one bit, and the value of the bit thus shifted out of the register is checked. If it is 1, the next index is retrieved from the bitstream and will be used to look up the next delta-pair. If an index of 0 is received, this indicates that the next delta-pair is a Large Delta, and must be added into Vp before the next pixel is decoded. The Large Deltas, in this embodiment, are simply the Small Deltas multiplied by 5. Therefore, the delta-pair value is multiplied by 5, and added to the previous delta-pair. Another index is then retrieved and looked up to re-start the decoding process.

At adder block 66, the delta-pair, termed ΔVq, is summed with Vp from the one cycle delay at block 68 (and with dCq at chroma block boundaries), generating Vo. Vo is stored in the one cycle delay at block 68. At adder block 70, Vo is summed with T (Top pixel-pair), the output from the one-line delay at block 72. The output, O, of adder 70 is stored in the one-line delay for the next row. If a correction was made at block 24(FIG. 2), an inverse correction is performed at optional gamma correction block 74.

The output is then converted into an analog video signal at digital to analog converter block 76 and sent to a video monitor for display such as at 78.

Figure 6:
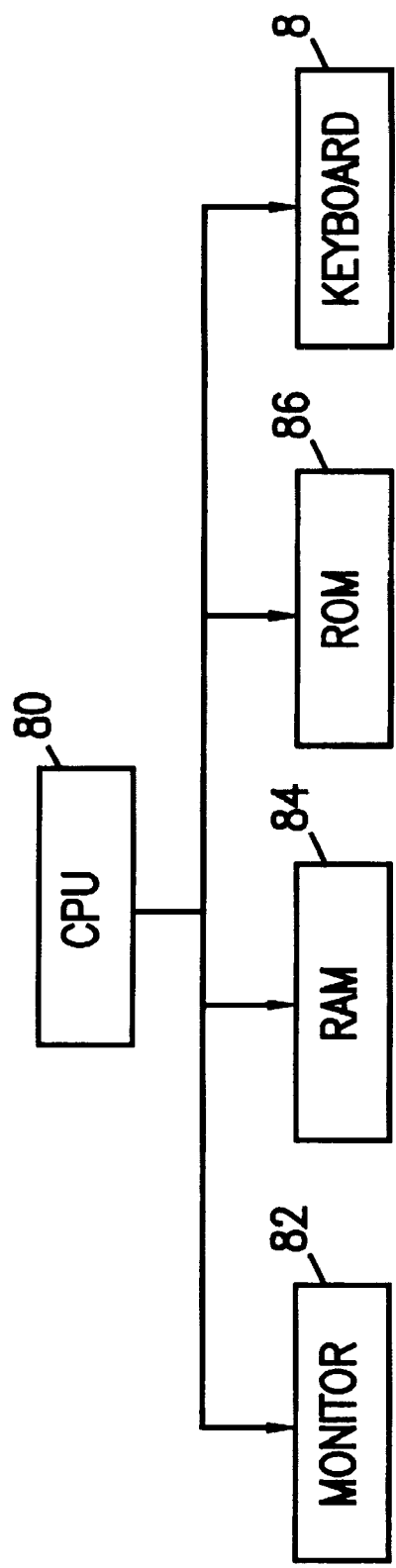
FIG. 6 is a block diagram of a digital computer run by software which can implement the present invention.

FIG. 6 is a block diagram showing a computer system which can enable the present invention to be run with software operating the computer. In a Representative Embodiment, an IBM compatible PC with an Intel Pentium-90 processor is employed. Windows 3.1 from Microsoft is installed, with MultiMedia Extensions. Microsoft's Video For Windows Developer Kit is also installed. CPU 80 is connected to a bus which interconnects monitor 82, RAM 84, ROM 86 and a keyboard 88. These elements of the IBM PC are employed to be programmed to perform the operations of the present invention.

As a description of an alternative embodiment, included in this application as an appendix is a complete source code and object code listing of software used in conjunction with the computer system just described to implement the present invention. Certain novel aspects of the invention are disclosed in this program listing that are not present in the previously described embodiment. One such novel aspect is an inter-frame version of the present invention, which adds to the basic invention the ability to decide on a pixel-block basis whether to use Asymmetric Delta Quantization and Two-Dimensional Delta Encoding, or alternatively to re-use block data from a previous frame. Extra data is included to encode block types, allocating one bit per block as control data. Another novel aspect is the ability to calculate an appropriate vertical delta for blocks encoded with Asymmetric Delta Quantization and Two-Dimensional Delta Encoding, using data from blocks in previous frames. A further novel aspect of this embodiment is the ability to encode images with alpha-channel information, providing partial and complete transparency as well as non-transparent pixels on a pixel by pixel basis. This allows real-time compositing of multiple, arbitrarily shaped images, including anti-aliased pixels at edge boundaries between foreground and background images. These novel aspects of the invention are described fully in the accompanying source and object code listings.

In summary, this invention possesses several important advantages over competing digital compression systems, Thus, video is not just pictures moving on the screen. The subjective "look" or "texture" of video and film, the grain and noise quality are extremely important to the artists working with this medium. Digital artifacts are obvious and unacceptable. The look of the image produced with the present invention is very natural and any degradation during the compression process is graceful and 'analog', without pixellation, jagged edges, blockiness or shower glass effects.

Other compression techniques are time-asymmetrical in nature; they require much more processing for compression than is necessary for decompression. Certain applications such as live news and sports broadcasting cannot tolerate compression delays. The present system is inherently time-symmetrical, addressing the needs of cable television as well as allowing the possibility of digital camcorders and VCRs.

Another aspect of the present invention relates to the manner in which error due to the compression process is distributed across the display to approximate the characteristic distribution of analog processes that is perceived as noise or grain analog film. This is achieved by the Two-Dimensional Delta Encoding process that tends to distribute the error downward and to the right. In this manner the error is distributed randomly in both the horizontal and vertical directions.

A device implementing the present invention will cost less to manufacture and use than other alternatives, requiring at least an order of magnitude fewer gates in an ASIC implementation. The present invention will not require multiple frame buffers (other systems require 4–8 MB RAM), further reducing the cost of the final product. The elegance and simplicity of implementation make it possible to have a quick design cycle.

The present invention is capable of compressing each frame of video independently. This means that true random access to any frame of video is possible: the user can instantly switch channels or interact in real time with stored video. A truly interactive non-linear environment is possible.

While the embodiment shown and described is fully capable of achieving the objects and advantages of the present invention, it is to be understood that this embodiment is shown and described for the purpose of illustration and not for limitation. The present invention is further disclosed by reference to the accompanying source code and object code, a copy of which is attached in the accompanying appendix. By reference to the source code and object code, the many embodiments and advantages of the present invention shall be apparent to those skilled in the art.

Having described this invention with regard to specific embodiments, it is to be understood that the description is not meant as a limitation since further modifications may suggest themselves to those skilled in the art and it is intended to cover such modifications as fall within the scope of the appended claims.

We claim:

1. A method for compressing data, comprising:

inputting a signal, said signal comprising data;

separating out said data of said signal, said data representing a series of pixels in a video image, said data comprising a data structure comprising data values;

selecting a predetermined number of data values in said data structure wherein said predetermined number of data values represent subsequent adjacent pixels, calculating deltas from said data structure using a computer, each of said deltas representing the difference between the value of a first pixel of said subsequent adjacent pixels and the value of a second pixel adjacent to said first pixel, choosing a series of deltas for a quantized delta encoding of said predetermined number of data values, said series of deltas being selected to prevent overflow conditions during subsequent decoding of said encoded data, and quantizing said series of deltas by selecting a quantized delta from a set of predetermined quantized deltas to represent each of deltas from said series of deltas, each of said deltas being in one of a plurality of ranges, said plurality of ranges comprising negative ranges and positive ranges, said negative ranges being $NR_1$, $NR_2 \ldots NR_y$ wherein y is an integer, and said positive ranges being $PR_1, PR_2, \ldots PR_y$, each of said negative ranges being a series of negative numbers, and each of said positive ranges being a series of positive numbers, said set of predetermined quantized deltas comprising negative quantized deltas and positive quantized deltas, said negative quantized deltas being $NQD_1, NQD_2, \ldots NQD_y$ and said positive quantized deltas being $PQD_1, PQD_2, \ldots PQD_y$, said quantized deltas being used to represent each of said deltas from said series of deltas such that a negative quantized delta $NQD_x$ is used to represent any of the deltas in a negative range $NR_x$, and a positive quantized delta $PQD_x$ is used to represent any of the deltas in a positive range $PR_x$, wherein x is an integer between 1 and said y.

2. A method as claimed in claim 1, in which said data is further encoded using Asymmetric Delta Quantization.

3. A method as claimed in claim 1, in which said data is further encoded using two-dimensional delta encoding, said two-dimensional delta encoding comprising calculating vertical differentials from said subsequent adjacent pixels, calculating a set of deltas from said vertical differentials using a computer, each of said deltas representing the difference between the value of a vertical differential and the value of a second, adjacent vertical differential, and then quantizing said deltas.

4. A method as claimed in claim 1, in which said data is further encoded using RGB encoding.

5. A method as claimed in claim 1, in which said data is converted into color components, said color components comprising Luminance, Red-Green, and Blue-Green components.

6. A method as claimed in claim 5, in which said color components are encoded into Luminance Deltas and Color Deltas.

7. A method as claimed in claim 1, in which said data is encoded into Keyframe images.

8. A method as claimed in claim 1, in which said data is encoded into Interframe images.

9. A method as claimed in claim 8, in which said Interframe images are encoded using Keyrows.

10. A method as claimed in claim 1, in which said data is encoded using String Encoding.

11. A method as claimed in claim 1, further comprising the step of storing said electrical signal.

12. A method as claimed in claim 1, further comprising the step of storing said encoded data.

13. A method as claimed in claim 1, further comprising the step of decoding said encoded data.

14. A method as claimed in claim 1, further comprising the step of transmitting said encoded data.

15. A method as claimed in claim 13, further comprising the step of converting said decoded data into an electrical signal.

16. A method for compressing data corresponding to the pixels of a video image, said method comprising:

providing data representing a series of pixels in a video image, said series of pixels corresponding to adjacent lines of said video image;

encoding said data using a computer, said encoding further comprising calculating deltas from said series of pixels using a computer, each of said deltas representing the difference between the value of a first pixel of said video image and the value of a second pixel adjacent to said first pixel, and selecting a quantized delta from a set of predetermined quantized deltas to represent each of said calculated deltas, each of said calculated deltas being in one of a plurality of ranges, said plurality of ranges comprising negative ranges and positive ranges, said negative ranges being $NR_1$, $NR_2 \ldots NR_y$ wherein y is an integer, and said positive ranges being $PR_1, PR_2, \ldots PR_y$, each of said negative ranges being a series of negative numbers, and each of said positive ranges being a series of positive numbers, said set of predetermined quantized deltas comprising negative quantized deltas and positive quantized deltas, said negative quantized deltas being $NQD_1, NQD_2, \ldots NQD_y$ and said positive quantized deltas being $PQD_1, PQD_2, \ldots PQD_y$, said quantized deltas being used to represent said deltas such that a negative quantized delta $NQD_x$ is used to represent any of the deltas in a negative range $NR_x$, and a positive quantized delta $PQD_x$ is used to represent any of the deltas in a positive range $PR_x$, wherein x is an integer between 1 and said y, wherein said quantized deltas to be encoded are selected to prevent overflow conditions during subsequent decoding of said encoded data.

17. A method for compressing data corresponding to the pixels of a video image, said method comprising:

providing data representing a series of pixels in a video image, said series of pixels corresponding to adjacent lines of said video image, said pixels being RGB pixels, the RGB pixels being pixels each having an R, a G and a B field;

encoding said data using a computer, said encoding further comprising two dimensional delta encoding, said two dimensional delta encoding comprising calculating vertical differentials between said adjacent lines of pixels, each vertical differential being the difference between the value of a first pixel and a second pixel, said first pixel being a pixel in a first line of said adjacent lines, and said second pixel being a pixel in a second line of said adjacent lines, and delta encoding said vertical differentials by first calculating a set of deltas from said vertical differentials using a computer, each of said deltas representing the difference between the value of a first vertical differential and the value of a second, adjacent vertical differential, and then quantizing said deltas, said pixels further being encoded such that during decoding of said RGB pixels, said individual R, G and B fields can be generated in a single operation without any overflow conditions.

18. A method for compressing data corresponding to the pixels of a video image, said method comprising:

providing data representing a series of pixels in a video image, said series of pixels corresponding to adjacent lines of said video image, said pixels being RGB pixels, the RGB pixels being pixels each having an R, a G and a B field;

encoding said data using a computer, said encoding further comprising calculating deltas from said series of pixels using a computer, each of said deltas representing the difference between the value of a first pixel of said video image and the value of a second pixel adjacent to said first pixel, and selecting a quantized delta from a set of predetermined quantized deltas to represent each of said calculated deltas, each of said calculated deltas being in one of a plurality of ranges, said plurality of ranges comprising negative ranges and positive ranges, said negative ranges being $NR_1$, $NR_2 \ldots NR_y$ wherein y is an integer, and said positive ranges being $PR_1, PR_2, \ldots PR_y$, each of said negative ranges being a series of negative numbers, and each of said positive ranges being a series of positive numbers, said set of predetermined quantized deltas comprising negative quantized deltas and positive quantized deltas, said negative quantized deltas being $NQD_1, NQD_2, \ldots NQD_y$ and said positive quantized deltas being $PQD_1, PQD_2, \ldots PQD_y$, said quantized deltas being used to represent said deltas such that a negative quantized delta $NQD_x$ is used to represent any of the deltas in a negative range $NR_x$, and a positive quantized delta $PQD_x$ is used to represent any of the deltas in a positive range $PR_x$, wherein x is an integer between 1 and said y, said delta encoding further comprising providing a set of large deltas, said set of large deltas being used to encode said calculated deltas when necessary to prevent any overflow conditions from occurring within any of the fields of said pixel during subsequent decoding.

* * * * *